(12) United States Patent
Krawetz (10) Patent No.: US 8,108,315 B2
(45) Date of Patent: Jan. 31, 2012

(54) DISCOVERING SOFTWARE CODE SUBJECT TO LICENSES

(75) Inventor: Neal Krawetz, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1617 days.

(21) Appl. No.: 11/455,515

(22) Filed: Jun. 19, 2006

(65) Prior Publication Data

US 2007/0294179 A1 Dec. 20, 2007

(51) Int. Cl.
*G06F 21/00* (2006.01)

(52) U.S. Cl. ............ 705/59; 705/51; 726/22; 726/23; 726/24; 726/25; 717/110; 717/101; 717/123; 707/10

(58) Field of Classification Search .......... 705/51, 705/59; 726/24, 22, 23, 25; 717/110, 101, 717/123; 707/10
See application file for complete search history.

(56) References Cited

U.S. PATENT DOCUMENTS

| | | | |
|---|---|---|---|
| 3,711,863 A * | 1/1973 | Bloom | 714/38 |
| 5,937,084 A * | 8/1999 | Crabtree et al. | 382/137 |
| 5,974,254 A * | 10/1999 | Hsu | 717/109 |
| 6,145,124 A * | 11/2000 | Price | 717/153 |
| 6,199,201 B1 * | 3/2001 | Lamping et al. | 717/114 |
| 6,282,698 B1 * | 8/2001 | Baker et al. | 717/118 |
| 6,748,584 B1 * | 6/2004 | Witchel et al. | 717/136 |
| 7,080,037 B2 * | 7/2006 | Burger et al. | 705/50 |
| 7,100,195 B1 * | 8/2006 | Underwood | 726/2 |
| 7,210,041 B1 * | 4/2007 | Gryaznov et al. | 713/188 |
| 7,296,261 B2 * | 11/2007 | Witchel et al. | 717/136 |
| 7,359,948 B2 * | 4/2008 | Ralston et al. | 709/206 |
| 7,398,553 B1 * | 7/2008 | Li | 726/22 |
| 7,421,418 B2 * | 9/2008 | Nakano | 706/52 |
| 7,500,222 B2 * | 3/2009 | Bates et al. | 717/111 |
| 7,503,035 B2 * | 3/2009 | Zeidman | 717/123 |
| 7,542,958 B1 * | 6/2009 | Warren et al. | 706/48 |
| 7,707,634 B2 * | 4/2010 | Sandu et al. | 726/24 |
| 7,797,245 B2 * | 9/2010 | Pedersen | 705/59 |
| 2002/0188608 A1 * | 12/2002 | Nelson et al. | 707/10 |
| 2003/0101144 A1 | 5/2003 | Moreno | |
| 2003/0221116 A1 * | 11/2003 | Futoransky et al. | 713/189 |
| 2004/0153994 A1 * | 8/2004 | Bates et al. | 717/110 |
| 2004/0177088 A1 * | 9/2004 | Jeffrey | 707/102 |
| 2004/0199594 A1 * | 10/2004 | Radatti et al. | 709/206 |
| 2004/0264696 A1 | 12/2004 | Cockburn et al. | |
| 2005/0015758 A1 * | 1/2005 | North | 717/138 |
| 2005/0065970 A1 * | 3/2005 | King et al. | 707/102 |
| 2005/0172338 A1 * | 8/2005 | Sandu et al. | 726/22 |
| 2005/0216898 A1 * | 9/2005 | Powell et al. | 717/141 |
| 2005/0278259 A1 * | 12/2005 | Gunaseelan et al. | 705/59 |
| 2006/0064682 A1 * | 3/2006 | Tanaka | 717/161 |
| 2006/0116966 A1 * | 6/2006 | Pedersen et al. | 705/59 |
| 2006/0129523 A1 * | 6/2006 | Roman et al. | 707/1 |
| 2006/0136867 A1 * | 6/2006 | Schneider et al. | 717/106 |

(Continued)

FOREIGN PATENT DOCUMENTS

JP 05158765 6/1993

*Primary Examiner* — Mamon Obeid (57) ABSTRACT

Embodiments include methods, apparatus, and systems for discovering whether software files are associated with licenses. One method of software execution includes dividing software code into plural functions, transforming each function into plural tokens, and comparing the plural tokens with a set of tokens that corresponds with a known function subject to a software license.

5 Claims, 6 Drawing Sheets

U.S. PATENT DOCUMENTS

| | | | |
|---|---|---|---|
| 2006/0212464 A1* | 9/2006 | Pedersen | 707/101 |
| 2006/0277531 A1* | 12/2006 | Horwitz et al. | 717/137 |
| 2007/0088740 A1* | 4/2007 | Davies et al. | 707/103 R |
| 2007/0260651 A1* | 11/2007 | Pedersen | 707/204 |
| 2007/0261038 A1* | 11/2007 | Suba et al. | 717/136 |
| 2008/0091938 A1* | 4/2008 | Pedersen et al. | 713/153 |

* cited by examiner

|   | h | e | l | l | o |
|---|---|---|---|---|---|
| c |   |   |   |   |   |
| h |   |   |   |   |   |
| e |   |   |   |   |   |
| l |   |   |   |   |   |
| o |   |   |   |   |   |
| e |   |   |   |   |   |

FIG. 3A

|   | h | e | l | l | o |
|---|---|---|---|---|---|
| c |   |   |   |   |   |
| h | 1 |   |   |   |   |
| e |   | 1 |   |   |   |
| l |   |   | 1 | 1 |   |
| o |   |   |   |   | 1 |
| e |   | 1 |   |   |   |

FIG. 3B

|   | h | e | l | l | o |
|---|---|---|---|---|---|
| c | 0 | 0 | 0 |   |   |
| h | 1 | 0 | 0 |   |   |
| e | 0 | 2 | 1 |   |   |
| l | 0 | 1 | 3 | 1 |   |
| o |   |   |   |   | 1 |
| e |   | 1 |   |   |   |

FIG. 3C

|   | h | e | l | l | o |
|---|---|---|---|---|---|
| c | 0 | 0 | 0 | 0 | 0 |
| h | 1 | 0 | 0 | 0 | 0 |
| e | 0 | 2 | 1 | 1 | 1 |
| l | 0 | 1 | 3 | 3 | 2 |
| o | 0 | 1 | 2 | 3 | 4 |
| e | 0 | 2 | 2 | 3 | 3 |

FIG. 3D

|   | h | e | l | l | o |
|---|---|---|---|---|---|
| c | 0 | 0 | 0 | 0 | 0 |
| h | 1 | 0 | 0 | 0 | 0 |
| e | 0 | 2 | 1 | 1 | 1 |
| l | 0 | 1 | 3 | 3 | 2 |
| o | 0 | 1 | 2 | 3 | 4 |
| e | 0 | 2 | 2 | 3 | 3 |

DISCOVERING SOFTWARE CODE SUBJECT TO LICENSES

BACKGROUND

Open source software is source code or programs that are available at no charge to the public for study, use, and even modification. This code is freely shared between the public and software developers. Since the software is not proprietary, large groups of programmers can modify and improve the source code. The modified software is redistributed to the public and other programmers for use in a wide variety of software applications.

Generally, open source software is not commercially developed and distributed for financial gain since the source code is free. At the same time, however, the software is often subject to restrictions in the form of licenses. Open source licenses enable users to obtain the source code for free, but provide terms that can restrict use, modification, and redistribution of the source code. Such restrictions vary from license to license and range from being unrestrictive to quite restrictive. For instance, some licenses merely require users to preserve the name of the original authors or include a copyright statement within the actual source code. By contrast, other licenses severely restrict the rights of subsequent users to sue for patent infringement, collect royalties for derivative works, and grant licenses on modified versions of the software, to name a few examples.

Since some open source licenses can be quite restrictive, software developers and companies must review and understand the terms and conditions of licenses before spending significant resources in using or modifying the source code. This task, however, can be quite difficult since code can contain one or more functions that are subject to an unknown license. As one example, programmers can modify or reuse functions and then release the functions without acknowledging licenses governing the original functions. For instance, a function originally released under a license is reused and released without a license or reference to the original license. As another example, proprietary code can be reused or classified as open source when in fact such code is subject to one or more licenses. Further, non-proprietary code or open source code can be distributed with proprietary software and thus violate an open source license.

Portions of software code can thus be subject to one or more licenses even though such licenses are not reproduced or referenced with the code. In order to discover such licenses, a person could attempt to manually review all of the source code and compare it with code known to be subject to a license. This task would be difficult or even impossible given the proliferation, modification, and distribution of code throughout the world.

DETAILED DESCRIPTION

Embodiments in accordance with the present invention are directed to apparatus, systems, and methods for discovering whether software files are associated with or subject to one or more licenses. A portion of code or function within the code (such as source code or compiled objects) is analyzed to determine whether it is a likely derivation or modification from code subject to one or more licenses. Exemplary embodiments quickly and accurately identify code that is subject to one or more software licenses, even though such licenses are not included with or referenced by the code. Even if the files contain code that exceeds tens of thousands of lines, functions subject to licenses are identified in the code. Such identification automatically occurs with little or no human intervention.

In one exemplary embodiment, one or more files are reviewed to determine if such files are subject to or governed by any licenses or other restrictive terms and conditions. The number of files can vary from one file to hundreds of thousands of different files. Each file is initially divided into one or more functions. The functions are examined for the occurrence of certain or specific terms. Such terms are replaced with generic terms. Each function is then transformed into a set of tokens. The tokens corresponding to each function are compared with sets of tokens that correspond with known or pre-existing licensing functions. In other words, tokens of source functions are compared with tokens from known functions that are subject to one or more licenses. This comparison reveals a correlation between the source or candidate function and known functions. A determination is made whether a match exists. If a match exists, then the source function (like the known function) is governed by one or more pre-existing or known software licenses.

In one exemplary embodiment, an alignment matrix compares a source or candidate function with a known function. Specifically, the matrix compares two sequences of symbols against each other. The sequences of symbols are derived from a set of tokens for the respective functions. The system determines whether the two sequences are homologous (i.e., similar). Results for this determination are logged, stored, and/or output to a user.

Figure 1:
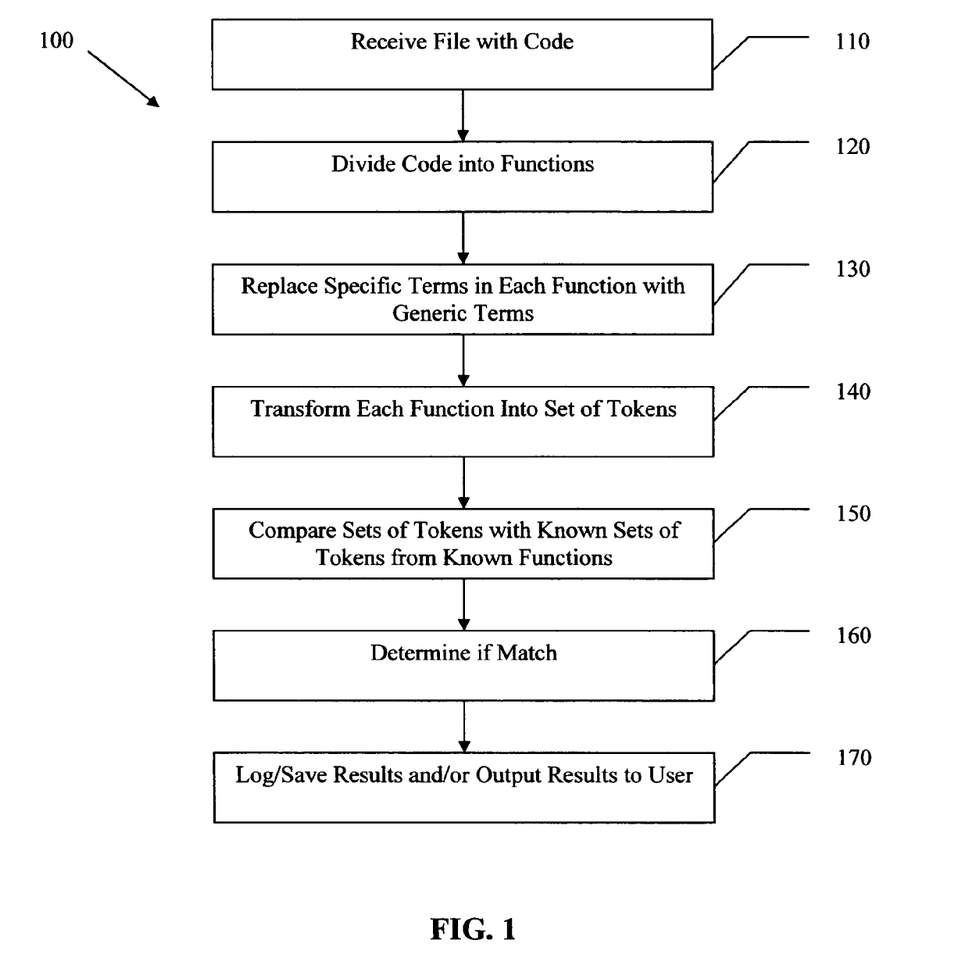
FIG. 1 is an exemplary flow diagram for determining if code is subject to one or more software license in accordance with an exemplary embodiment of the present invention.

FIG. 1 is a flow diagram 100 for determining if code is subject to one or more software license in accordance with an exemplary embodiment of the present invention. According to block 110, one or more files (referred to as candidate, target, or source files) or code are received or obtained. The code includes, but is not limited to, source code, compiled objects, and executables. For instance, the files can be distributed as part of one or more software distribution packages. The number of candidate files ranges from a single file to hundreds of thousands of files, such as files existing in an open source software package or an open source software distribution.

At this juncture, a determination is made as to whether any of the target files were previously inspected. In one exemplary embodiment, each package and archive are checked or compared against knowledge-bases of previously-inspected files. For example, if the source code for a particular version of a package was already processed, then the code is not re-processed since the results for the package were previously determined.

The target files can be "packed" or archived and contain one or more other files in a nested or compressed format. Each package and archive is recursively unpacked until further unpacking is not required (example, with data, executable code, and text files). Reference to the original file being unpacked is stored or remembered. In one exemplary embodiment, many different file formats are known or used for recursive unpacking. For example, such file formats include, but are not limited to, zip, tar, ar, cpio, gzip, bzip2, rpm, deb, rar, jar, cabinet files, postscript, and uuencode/uudecode, etc. Archives are recursively uncompressed and unpacked if such archives contain other files. Unpacking ceases once a determination is made that no more files require unpacking.

According to block 120, the code or target files are divided or separated into functions. As used herein, a "function" is a section of a program or code that performs a specific task. Functions can either return a value or perform an operation but not return a value. Depending on the programming language, functions have different names, such as subroutines, methods, procedures, or subprograms. Further, different file formats have different ways to identify functions (example, notations for functions in C language differ from notations in object code).

According to block 130, one or more specific terms in each function are replaced with one or more generic terms. For example, all variables (i.e., symbols denoting a quantity or symbolic representation) in each function are replaced with the word "variable" or "var" or other generic term As another example, all numbers in each function are replaced with the word "number" or "num" or other generic term.

According to block 140, each function is transformed into one or more tokens. As used herein, the word "token" means a categorized block of text, characters, or symbols that have a meaning. For example, token consists of indivisible characters or lexemes. Lexemes are read and categorized according to a function and provided a meaning, a process known as "tokenization." As used herein, the word "tokenization" means a process for demarcating and classifying one or more sections of a string of input characters.

According to blocks 130 and 140, functions are tokenized in different ways depending on the particular file format. As noted, variable names are replaced with "variable" and the term "variable" is thereafter treated as a keyword token. Further, numbers are replaced with "number" and the term "number" is thereafter treated as a keyword token. Tokenization can occur based on language-specific keywords (example, "if" or "while"), symbols (example, +, =, −, <, >, etc.), and scopes (example, ( ), { }, [ ], etc.). For example, the function "a+b=b+7" has tokens as "var+var=var+num." As another example, "call function (9)" has tokens as "call var(num)." Further, in one exemplary embodiment, the value of a token is not relevant.

According to block 150, tokens derived from the target functions are compared with tokens from known functions. In one exemplary embodiment, the known functions include code that is subject to or governed by one or more licenses.

In one exemplary embodiment, known or pre-existing software licenses are obtained or discovered, such as open source software licenses. Open source files are subject to thousands of different licenses. Many of these licenses are obtainable over the internet, in open source software distribution packages, through organizations utilizing Free and Open Source Software (FOSS), and through organizations promoting open source, to name a few examples. Each known license has one or more files that are subject to or governed by one or more licenses. The code in these files is thus known to have certain restrictions or limitations that per the license.

Once the known files are obtained, the files are divided into functions as discussed in connection with block 120. Certain terms in the functions are replaced with generic terms as discussed in connection with block 130. The functions are then transformed into one or more tokens as discussed in connection with block 140.

At this juncture, at least two different sets or sequences of tokens exist. A first set of tokens corresponds to the target function (i.e., the function for which a determination is sought as to whether it is subject to a known licensing terms). A second set of tokens corresponds to the compare or known function (i.e., the function previously known as being subject to a software license or otherwise subject to restrictive terms and/or conditions). Block 150 compares the two sets of token sequences.

According to block 160, a determination is made as to whether a match exists between the tokens corresponding to the target function and the tokens corresponding to the compare or known function. In one exemplary embodiment, for each pair of functions, an alignment matrix is computed. A maximum value is identified in the alignment matrix, and a determination is made as to whether a match exists. A match exists, for instance, if a similarity or commonality between the target function and compare function meet or exceed a threshold (example, 70%, 80%, or other predetermined value).

According to block 170, results from block 160 are logged or saved. In one exemplary embodiment, results are provided to a user (example, as a report, output to a display, etc.). In one exemplary embodiment, matches that meet or exceed a threshold or have a predefined similarity are logged (example, store the name of the target and known functions, percent match, exact tokens that did and/or did not match, etc.).

Figure 2:
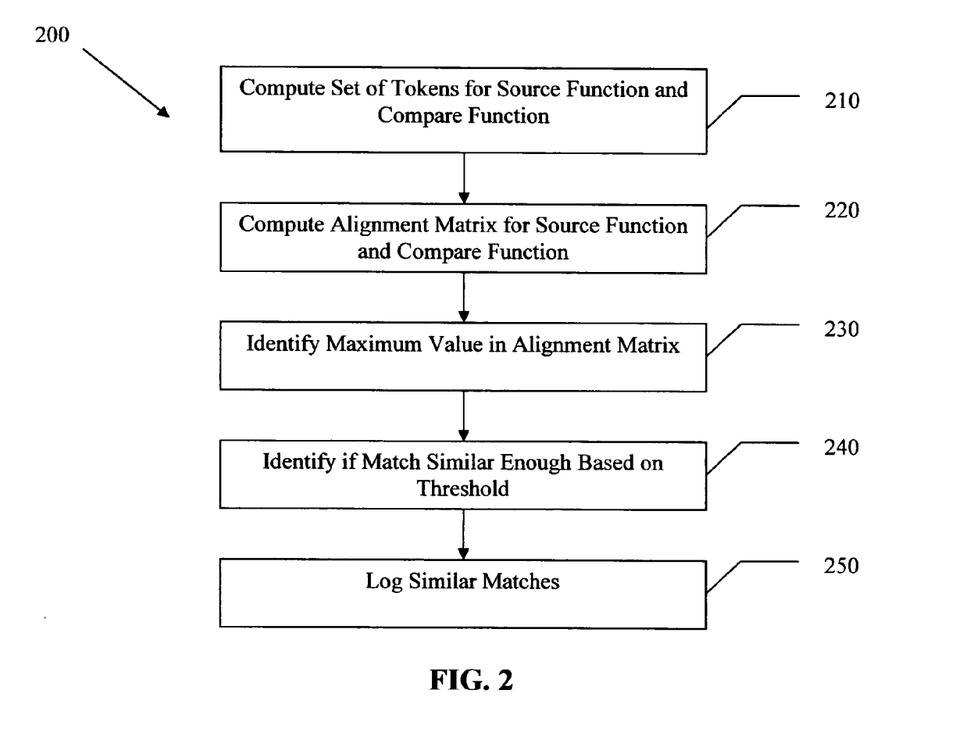
FIG. 2 is an exemplary flow diagram for determining if two functions are similar in accordance with an exemplary embodiment of the present invention.

FIG. 2 is an exemplary flow diagram 200 for determining if two functions are similar in accordance with an exemplary embodiment of the present invention. FIG. 2 is discussed in connection with FIGS. 3A-3E (showing a series of diagrams to illustrate an exemplary embodiment for determining if one or more source or candidate functions is subject to one or more known or pre-existing licenses). Each distinct letter in the examples represents a distinct token. A symbolic alignment matrix is used to compare two sequences of symbols against each other and determine whether such sequences are similar.

According to block 210, one or more tokens are computed for the source function and the compare function. This stage is discussed in more detail at blocks 110-140 in FIG. 1.

In one exemplary embodiment, two portions of compiled objects are compared to determine whether they are likely derivations from the same source code. This comparison is based on two assumptions: (1) the same source code yields the same operation code, and (2) the same operation code sequences are created by the same source code. For instance, when two different software developers independently create the same functionality, their source code is likely unique and generates unique operation code sequences. When code is used as a template, the code generally has a similar appearance but generates different operation code sequences. By contrast, when source code is reused (example, borrowed, modified, leveraged, copied, etc.), minor modifications exist, but the primary functional elements remain the same. Since the code in this latter scenario is primarily the same or equivalent, the code generates similar operation code sequences. Embodiments in accordance with the present invention identify portions or segments of similar code and homologous functionality.

Embodiments in accordance with the present invention can utilize one or more assumptions for analyzing code and determining whether similarities exist between candidate code and known code. Such assumptions include, but are not limited to, the following: macros, inline code, compiler optimizations, code reorder, and software developers. Macros can enable or disable different code segments, especially for debugging statements that are left in source code. Functions denoted as "inline" are usually inserted directly into functions. These functions can change the operation code sequences, but not necessarily change the look of the source code. Regarding compiler optimizations, different compiler options modify operation code sequences for better or optimal performance. Regarding code reordering, if two code segments S1 and S2 appear in source code file A as [S1, S2] but in a different source code file B as [S2, S1], then embodiments in accordance with the present invention identify the maximum alignment (if |S1|>|S2|, then only identify S1).

As noted, assumptions are also made regarding software developers. While these assumptions can result in a false-negative match, one or more of the following assumptions for software developers are considered valid. First, developers generally reuse functions and not individual lines of code. Second, developers may make minor changes to the functions, but not significant changes to such functions (significant changes typically lead to redevelopment rather than reuse). Third, developers generally do not reorder components in reused source code. Finally, developers generally use similar compiler options. For example, most kernel driver developers use the same compiler and compiler flags for the same platform.

For illustration purposes, two sequences of an A list and a B list are compared. Both lists contain a sequence of symbols (strings). The length of each list is denoted by |A| and |B|, respectively. The alignment matrix (shown in FIGS. 3A-3E) is denoted by A×B. The matrix position (a, b) indicates the intersection of A[a] and B[b] within A×B.

One exemplary embodiment determines the percentage of symbols in A that align with the symbols in B, and the percentage of symbols in B that align with the symbols in A. These percentages are denoted as A*B and B*A. For example, if A*B is 60%, then sixty percent of the symbols in A align with the symbols in B. Unless A and B are identical and the same length, it is likely that A*B and B*A will differ.

When two sequences have similar elements in a similar order, the two sequences are homologous. Homology is a qualitative description with two sequences either being homologous or not homologous (thus, in one exemplary embodiment, there are no "60% homologous" values). By contrast, similarity is a quantitative description. Two sequences can be 60% similar and also be considered homologous. Homology defines the threshold for similarity. Further, homology is asymmetrical. In other words, A can be homologous to B when B is not homologous to A. This scenario can occur when |B| is larger than |A|. Further yet, subsets can be homologous. For instance, A may not be homologous to B, but the subset "a" may be homologous to "b."

In one exemplary embodiment, the system assumes that similar sequences yield a similar functionality. This concept exists with symbols, such as source code lines or decompiled operation code sequences. Embodiments in accordance with the present invention thus permit comparing platform independent sequences.

In one exemplary embodiment, the alignment algorithm uses one or more of the following three stages or steps: initialization, identical identification, and alignment. These three stages are illustrated in FIGS. 3A-3E.

According to block 220, an alignment matrix is computed for the source function and the compare function. This stage is illustrated in connection with FIGS. 3A and 3B.

Figure 3A:
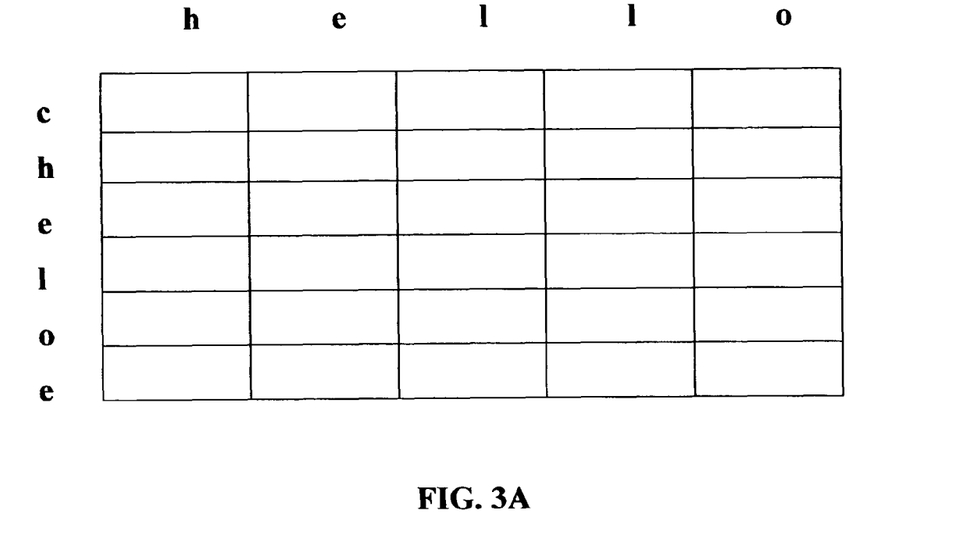
FIG. 3A is a first diagram for an alignment algorithm in accordance with an exemplary embodiment of the present invention.

FIG. 3A shows an initial or initialization stage for the alignment algorithm. Initially, symbols or sequences are aligned in a matrix. For illustration purposes, the symbols "cheloe" are selected for A, and the symbols "hello" are selected B. As shown, A's symbols (cheloe) are vertically arranged on the matrix, and B's symbols (hello) are horizontally arranged on the matrix. Each cell of the matrix is initially blank or zero.

Figure 3B:
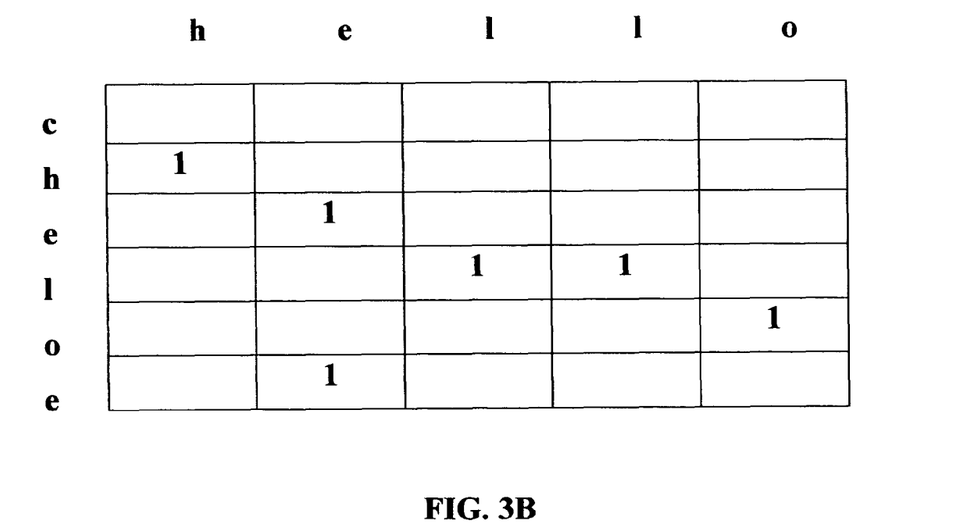
FIG. 3B is a second diagram for the alignment algorithm in accordance with an exemplary embodiment of the present invention.

FIG. 3B shows the stage of identical identification. Here, each position in the matrix A×B is marked with a "1" if A[a] is the same as B[b]. If A[a] is not the same as B[b], then the cell or matrix coordinate is blank (or marked with a "0"). Thus, FIG. 3B shows six different locations wherein A[a] is the same as B[b] (namely, (2, 1), (3, 2), (4, 3), (4, 4), (5, 5), and (6, 2)).

Figure 3C:
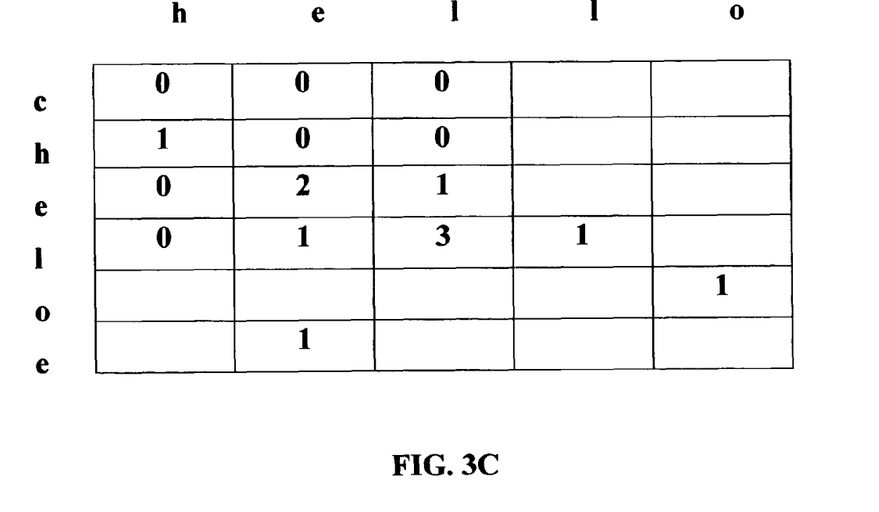
FIG. 3C is a third diagram for the alignment algorithm in accordance with an exemplary embodiment of the present invention.
Figure 3D:
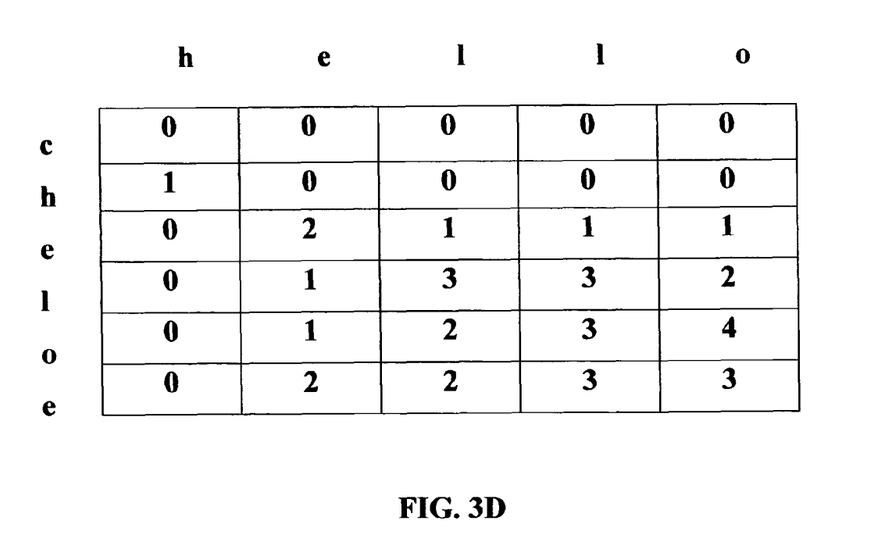
FIG. 3D is a fourth diagram for the alignment algorithm in accordance with an exemplary embodiment of the present invention.
Figure 3E:
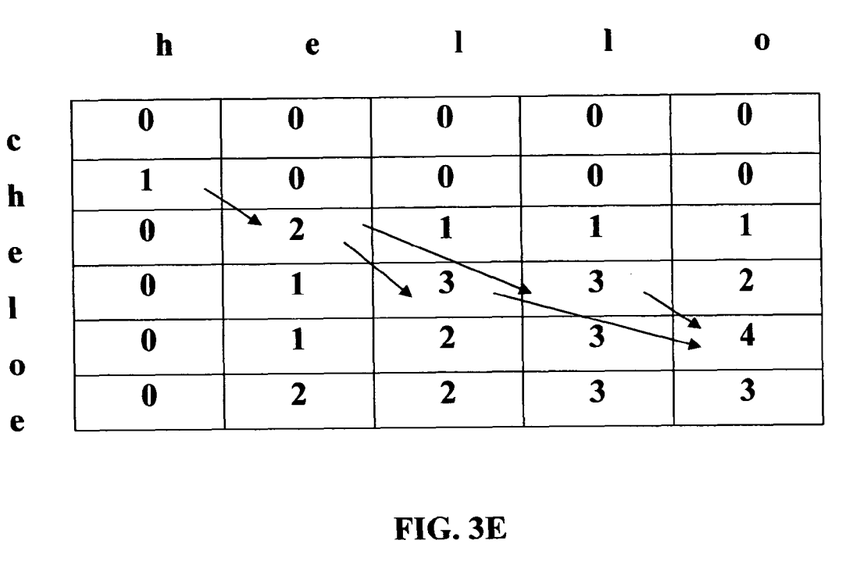
FIG. 3E is a fifth diagram for the alignment algorithm in accordance with an exemplary embodiment of the present invention.

According to block 230, maximum values are identified in the alignment matrix. Then, according to block 240, matches are identified if a similarity exists between the source function and compare function. In one exemplary embodiment, this similarity is based, at least in part, on one or more thresholds. FIGS. 3C-3E show the stages of alignment for blocks 230 and 240.

First, as shown in FIG. 3C, each cell in the matrix is updated to be the sum of itself and the maximum value in the sub-matrix [(0, 0), (a−1, b−1)]. Thus, the table element (3, 3) was initially zero or blank in FIG. 3B. In FIG. 3C, however, this table element (i.e., corresponding to letters "l" and "e") is updated to the value of one since the maximum value in the sub-table [(0, 0), (1, 1)] is one. Similarly, the table element (2, 3) representing "1"x"1" gains the value of three. For cell (2, 3): identical+max [(0, 0), (1, 2)]=1+2=3.

FIG. 3D shows the final table after each cell in the matrix is updated to be sum of itself and the maximum value in the sub-matrix [(0, 0), (a−1, b−1)]. As shown, the maximum value on the outer edge (i.e., four) indicates the maximum number of aligned characters. Thus, there are four aligned characters.

FIG. 3E shows the optimal alignment path. In particular, cells that contribute to the maximum value (shown along the arrows) indicate the optimal alignment path. In this example, the path indicates the following: (1) "4" comes from "o" (2) "3" comes from "1" (i.e., there are only two choices for "hello" but one choice for "cheloe"), (3) "2" comes from "e" "the first "e" in "cheloe"), and (4) "1" comes from "h." The horizontal and vertical gaps show exactly which symbols align: (1) "cheloe" aligns with "_helo_" and (2) "hello" aligns with "hel_o" or "he_lo" (as shown in the figures). Further, for percentage of alignment: (1) "cheloe" aligns with 80% of "hello" (i.e., 4/5 symbols), and (2) "hello" aligns with 67% of "cheloe" (i.e., 4/6 symbols).

If |A| is much larger than |B|, then B will likely have a relatively large percentage, while A will have a relatively lower percentage. If A and B are both non-trivial (i.e., both relatively large) and both have a high degree of similarity, then they are likely variants of each other. For example, a threshold of 80% indicates that a sequence is reused and thus corresponds to a known or pre-existing function subject to one or more licenses.

Exemplary embodiments in accordance with the present invention compare single letters or symbols. For instance, two elements are considered to be the same if the strings are identical. In one embodiment, the strings are lines from code, such as source code, decompiled assembly code, etc.

According to block 250, similar matches are logged, stored, and/or provided to a user. After the comparison, a list of matches exists. This list shows detailed matches (example, down to function level) and provides one or more of summaries, ranges, patterns, etc. The log can include extreme matches with many tokens. Small tokens can include a dozen tokens or fewer. Larger tokens can include hundreds or thousands of tokens. Matches, thus, can include a few tokens or thousands of tokens. In one exemplary embodiment, all files are identified as being a match when the total number of matching tokens (from all function comparisons) is greater than a specified threshold (example, greater than one thousand tokens).

The log can also include extreme matches with many functions. For instance, programmers will often copy more than one function from code (often, they copy or modify many functions). Thus, a check or verification is made to determine whether many functions (even functions with few tokens) appear to originate from the same files. If two files have similar functions, then they are likely similar. In one exemplary embodiment, a threshold value is approximately ten. For instance, if there are ≧10 similar functions between two files, then they are likely due to code reuse.

Embodiments in accordance with the present invention compare two or more functions (or sets of tokens derived from the functions) to determine a similarity between the functions. Given two source code files of the same language, a determination is made as to whether similar functions exist. Further, embodiments of the invention are also applicable to binary files and text files. For instance, given two binary files, a determination is made as to whether the object codes are similar. Here, similar operation code sequences generally require similar source code. For textual comparisons, each paragraph or text block is considered a function. Each word is a token (example, use a case insensitive approach and remove non-word characters).

Embodiments in accordance with the present invention thus create tokens based on the language (source code, binary files, text, etc.). As discussed below, exemplary embodiments are also optimized for many different functions.

Embodiments in accordance with the present invention are not limited to any particular criteria, threshold, number, factor, etc. for determining if two functions are similar or match. In one exemplary embodiment, given a matrix A×B (example, as noted in connection with FIGS. 3A-3E), a homologous match is determined when: (1) A*B is at least about 80% to 90%, (2) B*A is at least about 80% to 90%, (3) at least 10 symbols in both sets match (this scenario prevents short sets from creating false-positives in a match), and/or (4) the gap between aligned sequences is no more than five symbols wide (example, "hello" aligned with "hel_o" indicates a gap of one symbol).

In one exemplary embodiment, the alignment matrix algorithm is optimized in order to mitigate impact from large loops. The matrix is traversed no more than once. An optimized algorithm runs in $O(|A| \cdot |gB|)$, where gB is the maximum gap size for sequence B. The size of gB is no greater than $|B|$ and usually significantly less. For instance, the optimizations for the algorithm include one or more of byte pipelining, sub-matrix scanning, gap truncation, comparison restriction, comparison truncation, comparison omission, and string comparison. Further, the programming convention optimizations include one or more of matrix memory allocation and preprocessing versus caching.

In byte pipelining, the matrix is laid out as one large array: $(a, b)=A \times B[a] \cdot |B|+b]$. Using this layout, all bytes along the B-axis are sequential. This arrangement permits data pipelining due to linear memory accessing.

In sub-matrix scanning, various passes within the matrix are used (such as a first pass to assign 0/1 values, a second pass to update cells, a third pass to scan sub-matrices). In an optimized code, only one pass is made through the entire matrix. One of the filling properties of the algorithm places the maximum value of any sub-matrix along the outer edge. Thus, scanning the interior of any sub-matrix is not necessary; only the outer edge needs to be scanned. In one exemplary embodiment, the algorithm is:

For each cell (a, b)
    Find the maximum value along the outer edge:
        Edge #1: [(0, b−1), (a−1, b−1)]
        Edge #2: [(a−1, 0), (a−1, b−1)]
    Add maximum value to identical check: A[a]=B[b]?
    Store the value in the cell.

The result is a significant reduction in cells that are scanned in order to determine the maximum value of any sub-matrix.

In gap truncation, the maximum allowed gap between aligned symbols can be used as a restriction. When determining the value for matrix position (a, b), sub-matrix scanning only checks for outer edges of the sub-matrix: [(a−1, 0) to (a−1, b−1)] and [(0, b−1) to (a−1, b−1)]. For relatively larger values of a or b, this scan takes relatively large amount of time. As an optimization, the edges that correspond with the gap are scanned. For example, if the maximum allowed gap is three, then the sub-matrix scan reduces to [(a−1, b−4) to (a−1, b−1)] and [(a−4, b−1)] to (a−1, b−1)].

In comparison restriction, exemplary embodiments identify optimal matches. If the minimal match value is relatively large, then only cells along the middle diagonal of the matrix will ever be involved in the match. As such, cells not involved in the match do not need to be scanned. For example, assume two sequences of twenty are compared with a required 90% match. The match requires only that the maximum value be no less than sixteen (i.e., 90% of 20).

In comparison truncation, the matrix is scanned along the B-axis with the minimum required match for the A sequence. In particular, for any column "a", a verification or check is made if the maximum "b" matrix value is sufficient to lead to a match. When a match is not possible, the remainder of the matrix is skipped.

Comparison omission is similar to comparison restriction in that if the |A| and |B| are significantly different, a match may not be possible. For example, if both sequences must match by 90%, but |A|<90%·|B|, then these two sequences are not a match. Thus, the entire matrix filling and comparison are skipped.

In string comparisons, the symbols are stored as strings. Strcmp( ), though, is not a fast function. In order to reduce the number of strcmp( ) calls, each string is prefaced with a one-byte checksum (sum of all of the byes in the string). For a majority of comparisons, the checksum values will be different, indicating that strcmp( ) will not match and does not need to be called. The only calls to strcmp( ) occur when either the strings are identical or when the checksum collision exists.

In large sequences, allocating and initializing the matrix can require significant processing resources. In one exemplary embodiment, the matrix memory is optimized. In initialization, the matrix is neither allocated nor initialized unless a chance exists that the matrix results in a match. If the sequence sizes differ such that they cannot result in a successful alignment, then the matrix does not need to be accessed. In reallocation, when processing multiple sequences per file, the matrix is not reallocated unless it needs to be larger. For example, if the first comparison needs 400 cells and the second comparison needs 96 cells, then the matrix memory is not freed or reallocated between sequential calls. The matrix is only reallocated when the comparison requires more than 400 cells. In organization, the matrix is allocated as a single array, and not as a two-dimensional structure. This embodiment permits reuse regardless of the sizes of sequences. For example, a 20×20 matrix and 10×40 matrix can both use the same allocated matrix.

In one exemplary embodiment, a filtering function converts the input files into symbol sets. Filters thus convert desired data into a sequence of symbols. For instance, an operation code filter converts an executable of compiled object into a sequence of symbols with identified functions. This filter operates in multiple stages (such as acquire operation codes, identify functions, and remove constants).

During an initial stage, the operation code is acquired. For example, the filter runs the command "objdump-d" on the executable or object code. The "-d" parameter decodes the operation sequences into assembly language. A disassembler displays each function name and the operation code within the function, one assembly code per line.

During a second stage, non-functional and binary code is removed. For instance, each function name is prefaced with the word "Function" and a newline. The newline allows the algorithm to identify the start of the code of the next function. In one exemplary embodiment, each assembly line is prefaced with a period since some functions contain padding (example, sequences of zero) that do not resolve to a text operation code. Without the initial period, the padding lines would appear as a newline and incorrectly indicate the start of the next function.

During a third stage, constraints are removed from the code. The disassembled code contains link-time constraints that can change when the code is reused. In one exemplary embodiment, all constant values are removed.

The result from the filter is a pseudo-unique set of assembly commands. For large sequences (ten or more assembly lines), the likelihood of two different functions having homologous sections without having code reuse dramatically decreases.

Embodiments in accordance with the present invention are not limited to any particular type of filtering. Techniques for filtering, if implemented, depend in part on the particular software language. Since a majority of Linux kernel source code is written in ANSI-C, an example embodiment for filtering C-language is provided.

As one observation, when programmers use C source code, they usually create one or more of the following formatting changes: (1) white space, such as tabs and indents, are changed; (2) comments are added, modified, or removed; (3) variable and dependent function names are changed; (4) static values, such as strings or constants, are changed; (5) additional lines are added or existing lines are removed.

As another observation, when programmers use C source code, they usually do not change one or more of the following: (1) the number and relative position of tokens (example, symbols, parenthesis, scopes, mathematical operators) remain homologous; (2) the number and relative position of variables, strings, and functions remain homologous (example, code reuse may change a name of a function but a function is rarely changed into a variable or string); and (3) the number and type of function-parameters remain homologous.

In one exemplary embodiment, the filter for C source code operates in several different stages including, but not limited to, (1) remove comments and tag scopes, (2) identify functions, (3) replace parameters, and (4) remove tags.

During the first stage (i.e., remove comments and tag scopes), the entire source file is loaded into memory. As the file is loaded, the data is preprocessed with one or more of the following: (1) all ANSI-C comments are removed; (2) all C++ comments are removed; (3) all compiler directives are removed; (4) newlines are removed; (5) begin and end quotes and double-quotes are identified; (6) new scope is marked with the current scope depth. The result of this preprocessing is a single line containing all of the active source code objects. The line includes tags to identify matching scopes and strings.

During the second stage (i.e., identify functions), functions appear as a word space followed by a set of 0-scope parenthesis "(0 . . . )0" and a set of 0-scope braces "{0 . . . }0". All non-functional elements are removed. The items removed include, but are not limited to, function prototypes, structure definitions, global variables, macros, function return parameter definitions, and any variable definitions between the parenthesis and braces are removed. The result of this stage is a long sting containing a function name and the function scope.

As a subset to the second stage, the tokens are separated. The C preparser permits some tokens to be adjacent to variable or function names. To simplify the filtering process, tokens are distinctly separated. Some examples include semicolons (spaces are added before and after every semi-colon), commas, ++ and—assignment operators are padded with whitespace, all word tokens are padded with whitespace. Since some items get mistakenly separated, a second phase can be added to replace some items (example, any scope followed by a number has the space removed, and complex variables are joined).

As another subset to the second stage, variables are replaced. All variable and function names are replaced with the word "var". For the homology comparison, the reuse of variables is not significant (only the frequency and position of variables). Although this replacement makes no distinction between variables and functions, functions are still identifiable by the parenthesis after the "var" string. In one exemplary embodiment, the only variables not replaced are strings that are specific to the C language.

As another subset to the second stage, the strings are replaced. For example, all strings denoted by "< . . . >" and '< . . . >' are replaced. Double-quoted strings are placed with the text "string" and single quotes are placed with "char". Similarly, numbers (denoted by [0-9]+ or 0×[0-9]+) are replaced with "num".

As yet another subset to the second stage, variable definitions are removed. In one exemplary embodiment, this subset includes four types of actions within a function: (1) assignments: a=b, a++; (2) operators: a>b, a+b; (3) functions: a(b); and (4) declarations: int a. In one exemplary embodiment, declarations are only lines within a function that generate no operation code sequences.

During the third stage (i.e., replace parameters), it is noted that parameters "(0 . . . )0" may be within the function definition. During code reuse, the parameter types ("int" or "struct complex*") and variable names can vary. At the same time, the number of parameters remains homologous. A few parameters may be added or removed, but the overall number of parameters remains the same. In one exemplary embodiment, each parameter (both prototype and name) is replaced with the word "parm". The exception are void parameters which are removed.

During the fourth stage (i.e., remove tags), it is noted that reused source code can include additional scopes. To prevent scope tags from being used, all scope depth markers are removed. For example, "{0 . . . }0" becomes "{ . . . }".

After the fourth stage, the final result is a file containing function names and tokens, with one token per line. Further, after filtering, the code only contains symbols that indicate C tokens, variables, and strings. Further yet, the sequence of symbols per function are pseudo-unique per code functionality. For large sequences, the chances of two vastly different function having similar token sequences becomes very low.

With embodiments in accordance with the present invention, the need for human intervention in the license-review process is drastically reduced since target functions are compared against compare functions to determine if the target functions are subject to one or more known or pre-existing software licenses. Once the output is generated (example, displayed or printed in a report), a reviewer can easily review thousands of files to determine if any files contain code that is subject to a license.

Figure 4:
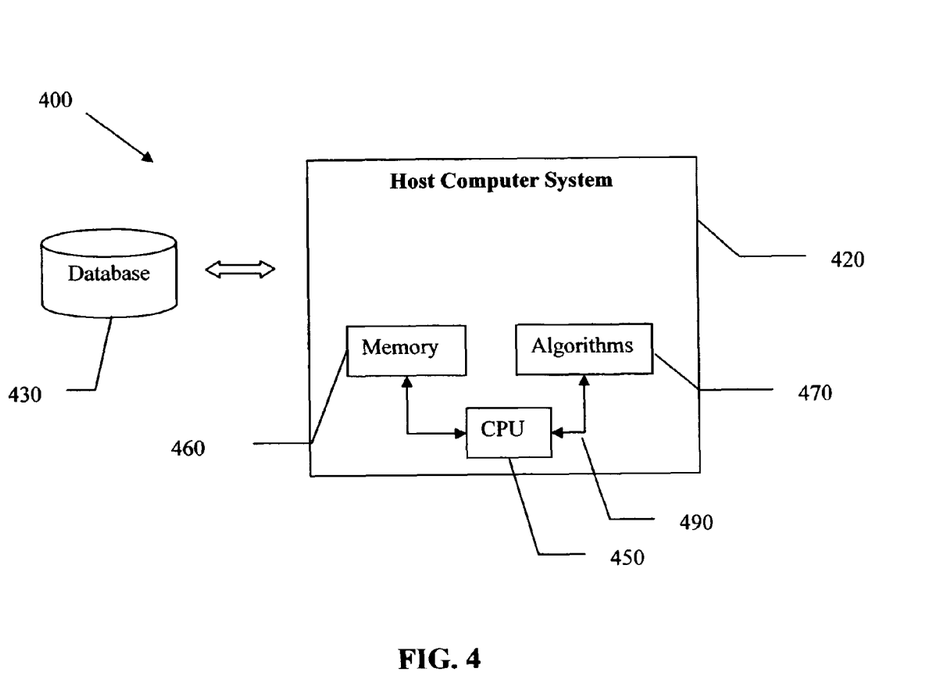
FIG. 4 is a block diagram of an exemplary computer system in accordance with the present invention.

Embodiments in accordance with the present invention are utilized in a variety of systems, methods, and apparatus. FIG. 4 illustrates an exemplary embodiment as a computer system 400 for utilizing one or more of the flow diagrams and/or aspects of exemplary embodiments in accordance with the present invention.

The system 400 includes a host computer system 420 and a repository, warehouse, or database 430. The host computer system 420 comprises a processing unit 450 (such as one or more processors of central processing units, CPUs) for controlling the overall operation of memory 460 (such as random access memory (RAM) for temporary data storage and read only memory (ROM) for permanent data storage) and algorithms 470 (which may be located in memory 460 or other location). The memory 460, for example, stores data, control programs, and other data associate with the host computer system 420. The processing unit 450 communicates with memory 460, data base 430, algorithms 470 (such as the alignment algorithm), and many other components via buses 490. These algorithms include, but are not limited to, the flow diagrams of FIGS. 1 and 2 and variations thereof.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

As used herein, the term "source code" means program instructions written in a particular programming language. Further, as used herein, the term "open source" refers to a program or source code that is available at no charge to the general public for use and modification. Further, as used herein, the term "license" means a contract or terms and conditions that grant a party explicit rights to use intellectual property. Thus, an open source license states terms, conditions, and/or restrictions on a licensor in order to use, modify, or redistribute open source. Open source often includes or is subject to an open source license. For instance, such licenses can specify different standards or restrictions regarding how the source code is used, distributed, or modified. By way of example, some of these standards include, but are not limited to, the following: licensed software cannot implement restrictions on other software distributed with the licensed software, all persons have equal access to the software, rights to the software are not contingent on the software being part of a specific software distribution, authors must allow modifications or derivative works and maintain the original name, collection of royalties for distribution of the program is prohibited, and discrimination against specific fields of endeavor is prohibited, to name a few examples.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer comprising:
dividing, by the computer, software code into plural functions;
replacing variables and numbers in the plural functions with generic terms;
transforming, by the computer, each function with the generic terms into first set of tokens;
replacing variables and numbers in a known function subject to a software license with the generic terms;
transforming the known function with the generic terms into a second set of tokens that are compared with the first set of tokens;
comparing, by the computer, the first set of tokens with the second set of tokens; and
in response to the comparing, determining that the software code includes a modified version of the known function and is thus subject to the software license.

2. The method of claim 1 further comprising, determining a similarity between the plural functions and the known function based on a number of tokens common to both the first set of tokens and the second set of tokens.

3. The method of claim 1 further comprising, arranging at least one of the first set of tokens and the second set of tokens in a matrix in order to determine a similarity between at least one of the plural functions and the known function.

4. The method of claim 1 further comprising, replacing the variables in the plural functions with a first generic term, and replacing the numbers in the plural functions with a second generic term.

5. The method of claim 1 further comprising, determining if operation code of the first set of tokens is similar to operation code of the second set of tokens.

* * * * *